(12) United States Patent
Dos Santos et al.

(10) Patent No.: US 12,089,768 B2
(45) Date of Patent: Sep. 17, 2024

(54) ELECTRIC COOKING APPLIANCE PROVIDED WITH A REMOVABLE HEATING DEVICE

(71) Applicant: SEB S.A., Ecully (FR)

(72) Inventors: Quentin Dos Santos, Lyons (FR); Géraldine Doat, Caluire Et Cuire (FR)

(73) Assignee: SEB S.A. (FR)

( * ) Notice: Subject to any disclaimer, the term of this patent is extended or adjusted under 35 U.S.C. 154(b) by 444 days.

(21) Appl. No.: 16/912,985

(22) Filed: Jun. 26, 2020

(65) Prior Publication Data
US 2020/0405086 A1 Dec. 31, 2020

(30) Foreign Application Priority Data
Jun. 27, 2019 (FR) ...................................... 1907038

(51) Int. Cl.
  *A47J 27/08* (2006.01)
  *A47J 27/086* (2006.01)
  *A47J 27/09* (2006.01)

(52) U.S. Cl.
  CPC ......... *A47J 27/086* (2013.01); *A47J 27/0804* (2013.01); *A47J 27/09* (2013.01)

(58) Field of Classification Search
  CPC .. A47J 27/004; A47J 27/0804; A47J 27/0811; A47J 27/086; A47J 27/09
  See application file for complete search history.

(56) References Cited

U.S. PATENT DOCUMENTS

| | | | |
|---|---|---|---|
| 7,523,696 B2 * | 4/2009 | Seurat Guiochet . | A47J 27/0813 220/573.1 |
| 10,660,470 B2 * | 5/2020 | Li | A47J 37/0629 |
| 2012/0012584 A1 | 1/2012 | Chameroy et al. | |
| 2019/0045964 A1 * | 2/2019 | Gill | A47J 27/12 |

FOREIGN PATENT DOCUMENTS

| | | | | |
|---|---|---|---|---|
| CN | 102687986 A * | 9/2012 | ........ | A47J 27/21175 |
| CN | 207012080 U | 2/2018 | | |
| CN | 109463999 A | 3/2019 | | |
| DE | 10031167 A1 * | 1/2002 | ............. | A47J 27/62 |
| EP | 2204112 A1 | 7/2010 | | |
| FR | 2958517 A1 | 10/2011 | | |

(Continued)

OTHER PUBLICATIONS

Machine translation of CN102687986 : Frade, Kettle including lid with retractable handle, 2012 (Year: 2012).*

(Continued)

*Primary Examiner* — Janie M Loeppke
*Assistant Examiner* — Abigail H Rhue
(74) *Attorney, Agent, or Firm* — Lerner David LLP

(57) ABSTRACT

An electric cooking appliance includes a housing having a cooking vessel configured to receive food to be cooked; a lid pivotably mounted on the housing between an open position in which the lid frees access to the cooking vessel and a closed position in which the lid prevents access to the cooking vessel; and a heating device which is removably mounted on an inner surface of the lid, the heating device having a heating device configured to be located opposite the food to be cooked received in the cooking vessel and for heating said food to be cooked when the lid is in the closed position.

15 Claims, 12 Drawing Sheets

(56) References Cited

FOREIGN PATENT DOCUMENTS

| JP | 2002078606 A | * | 3/2002 | |
|---|---|---|---|---|
| KR | 102393566 B1 | * | 9/2019 | ............. A47J 27/00 |
| WO | 2012056175 A2 | | 5/2012 | |
| WO | WO-2017077571 A1 | * | 5/2017 | ............. A47J 27/00 |

OTHER PUBLICATIONS

Machine translation of WO2017077571: Chihiro, Heat-Cooking Device and Lid, 2017 (Year: 2017).*
Machine translation of KR102393566 : Terao, rice cooker, 2019 (Year: 2019).*
Machine translation of DE-10031167: Blumenthal, Arrangement for cooking food with electric heating element incorporated in lid, used in combination with gas or electric hob, 2000 (Year: 2000).*
Machine translation of JP-2002078606: Miyamoto, The Cooker, 2002 (Year: 2002).*
Preliminary French Search Report for Application No. FR 1907038 dated Jan. 20, 2020, 2 pages.

* cited by examiner

[Fig 1]
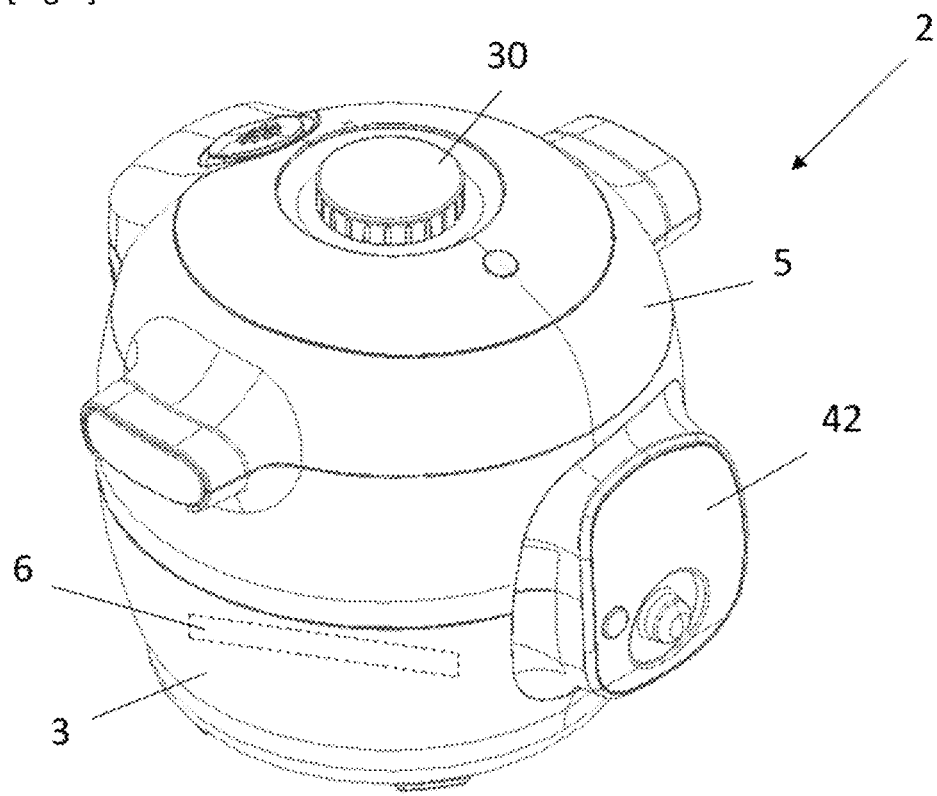
[Fig 2]
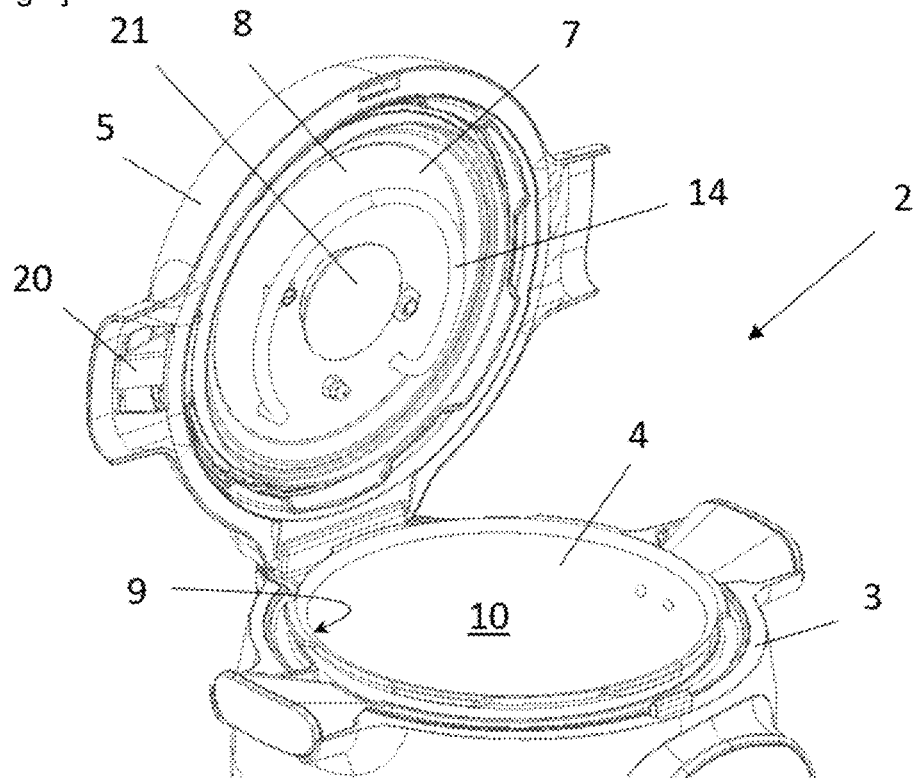

[Fig 3]
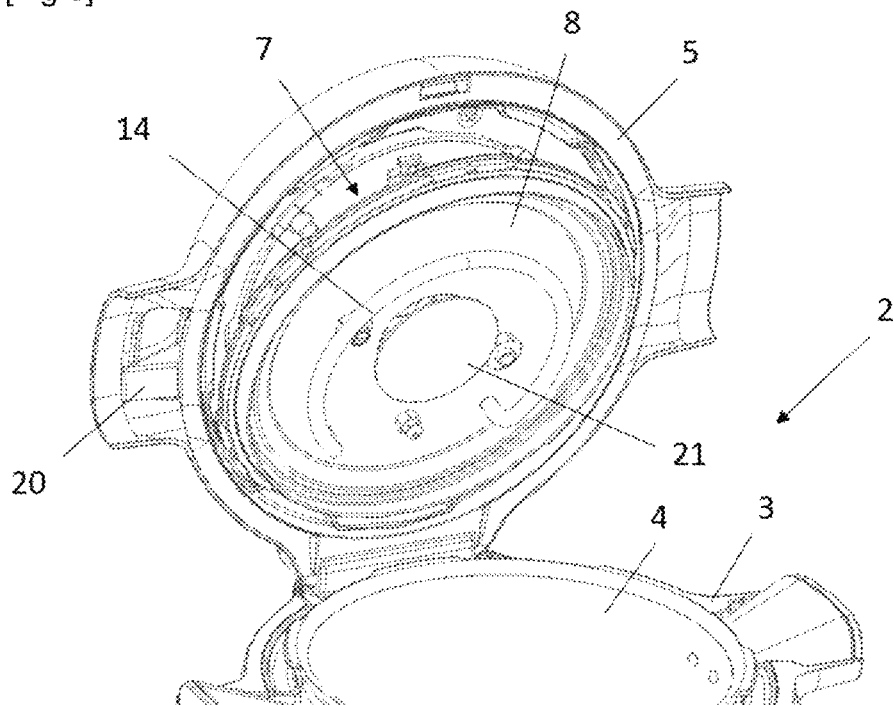
[Fig 4]
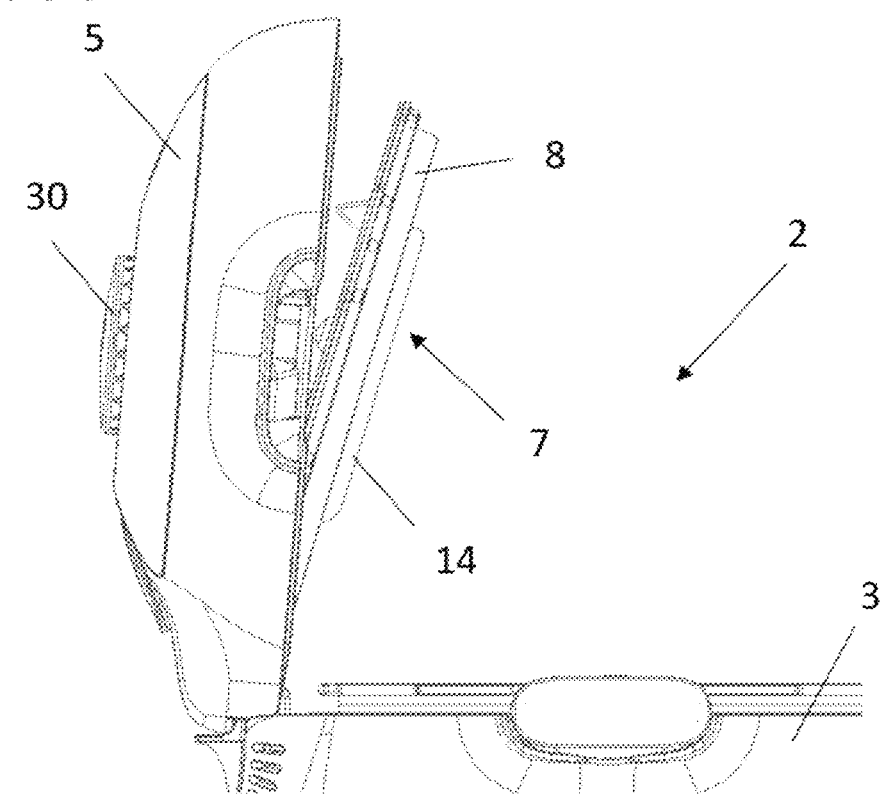

[Fig 5]
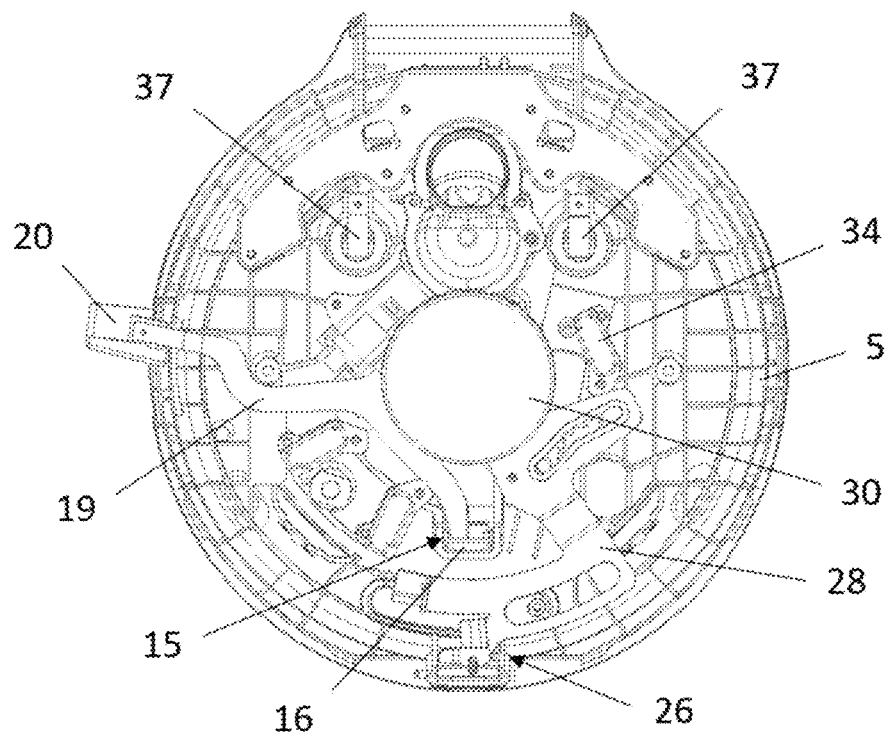
[Fig 6]
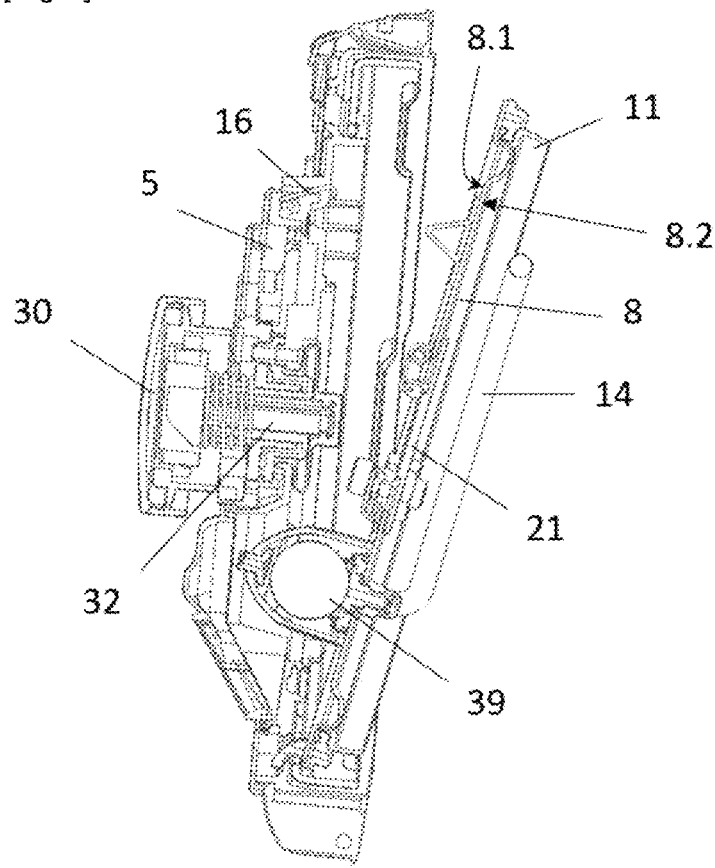

[Fig 7]
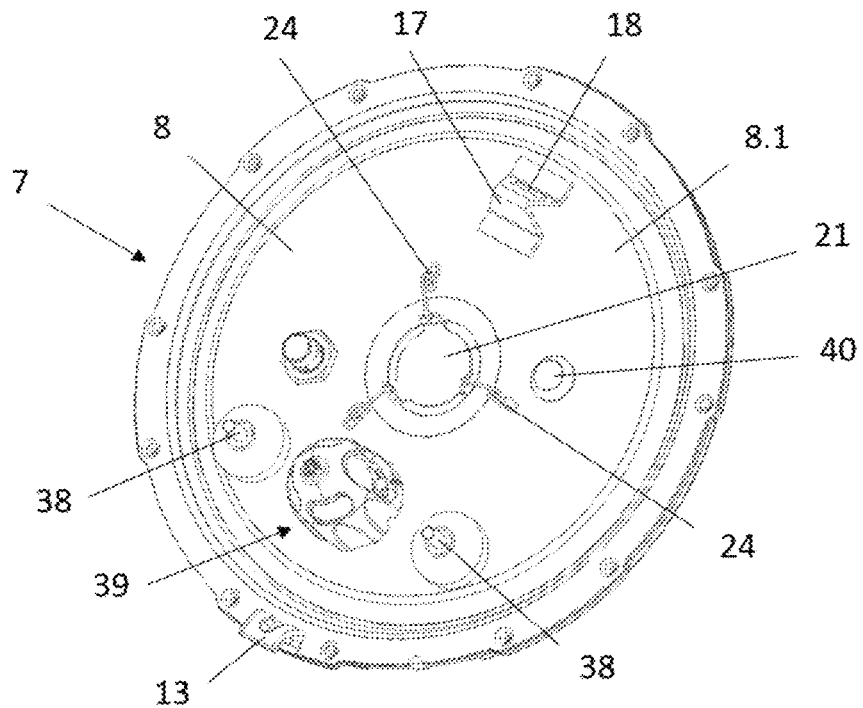
[Fig 8]
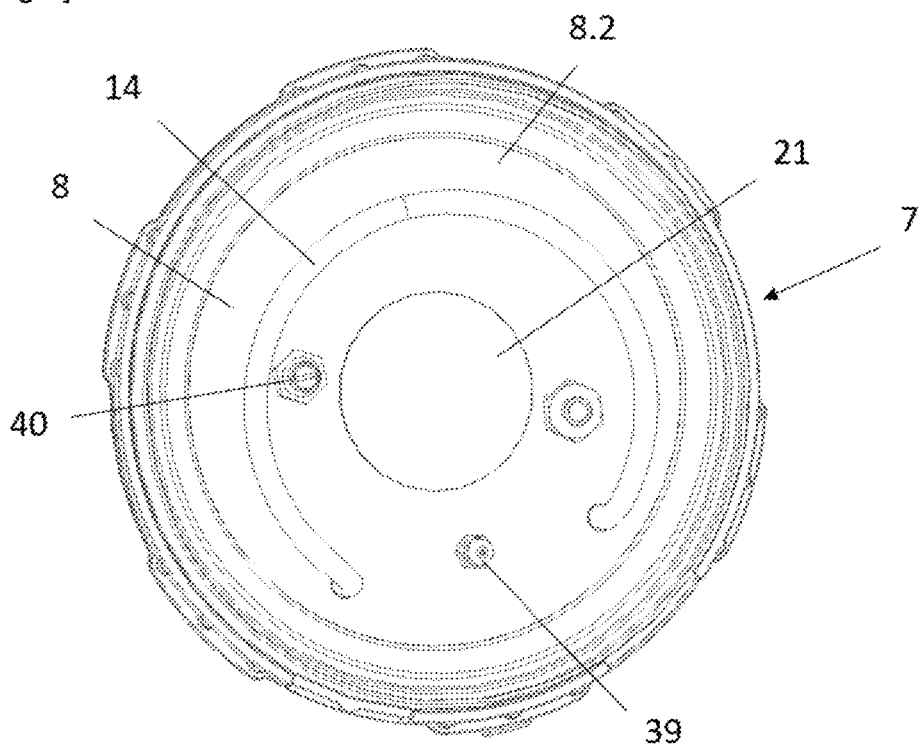

[Fig 9]
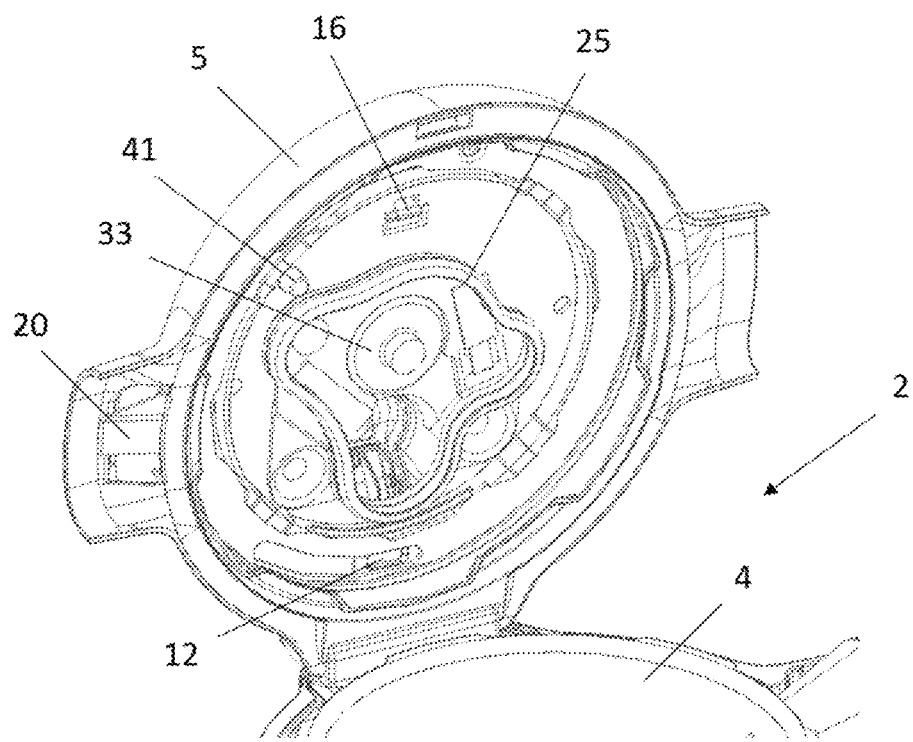
[Fig 10]
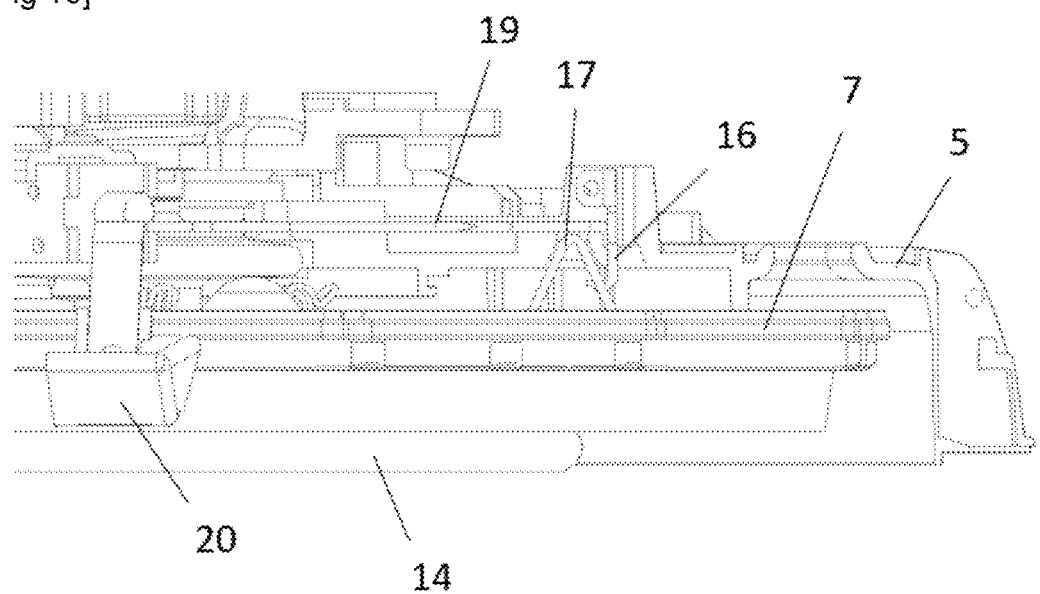

[Fig 11]
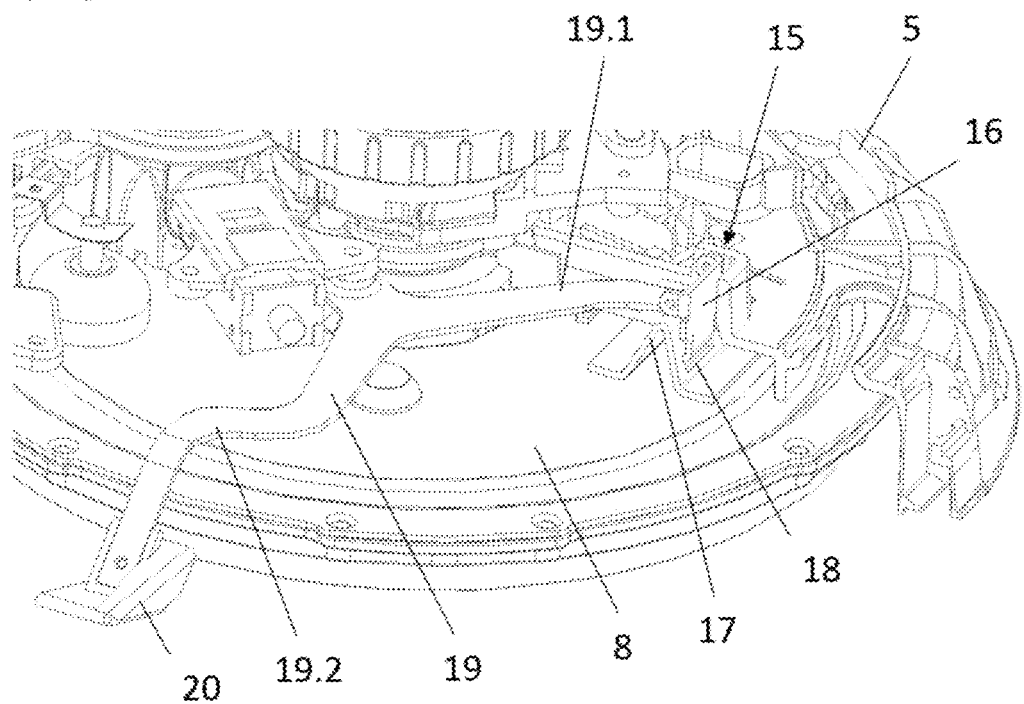
[Fig 12]
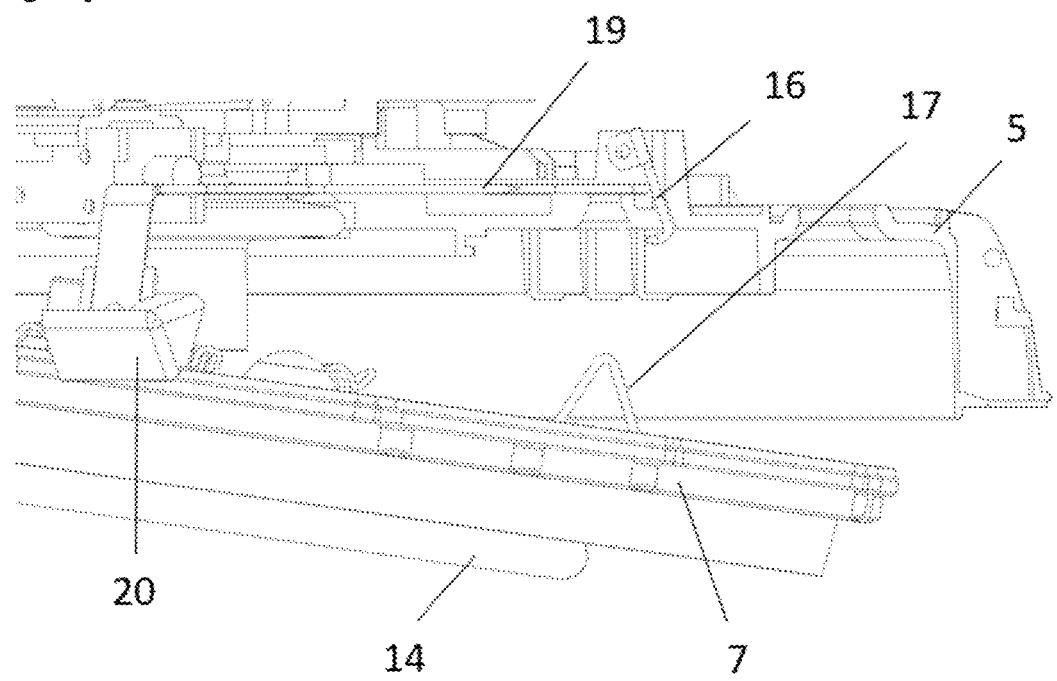

[Fig 13]
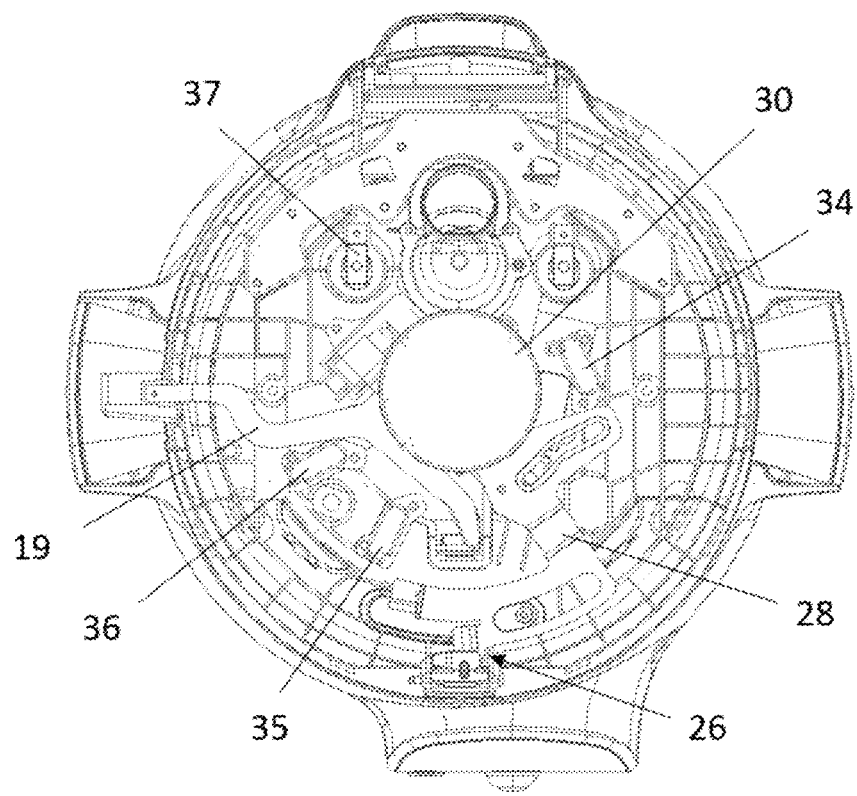
[Fig 14]
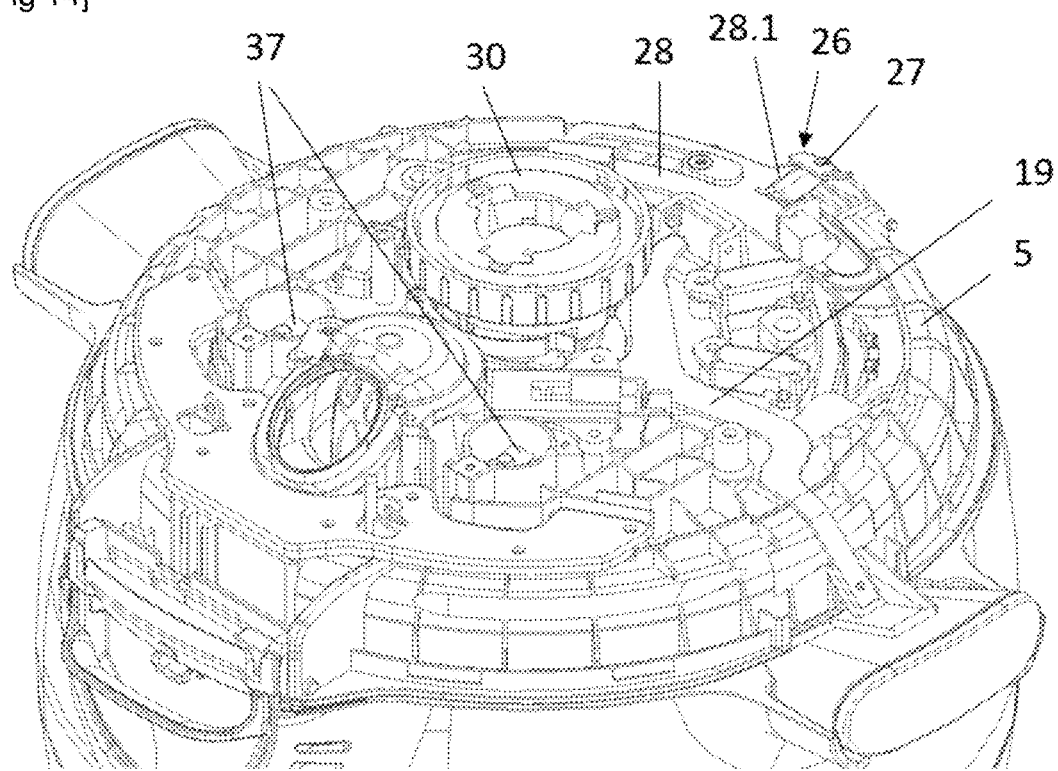

[Fig 15]
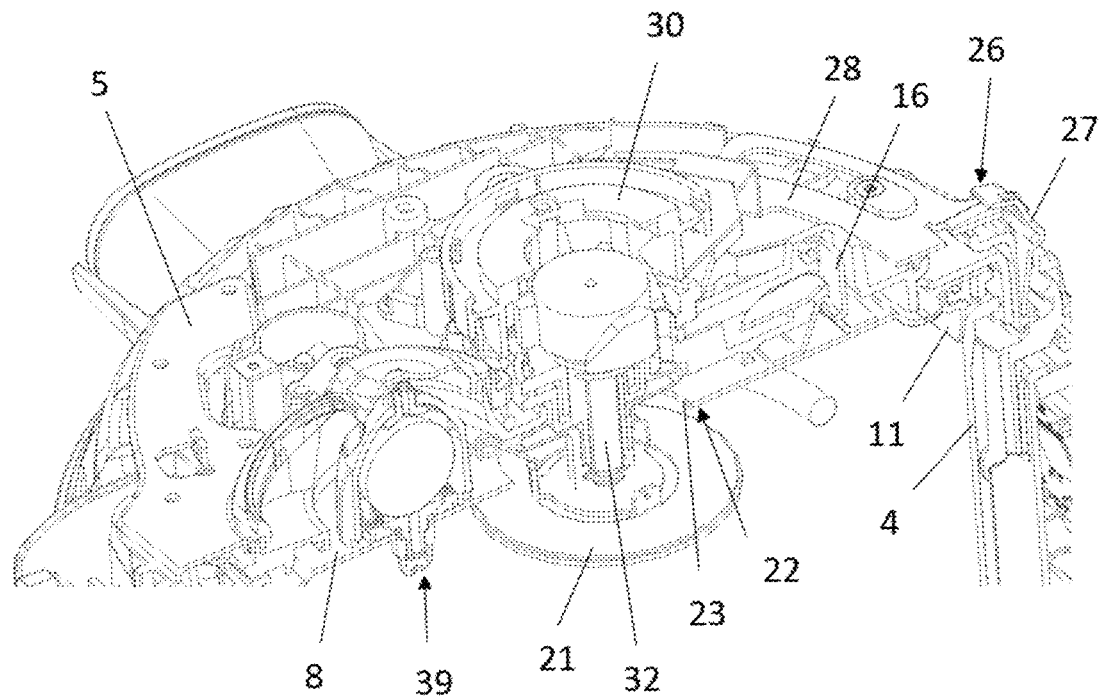
[Fig 16]
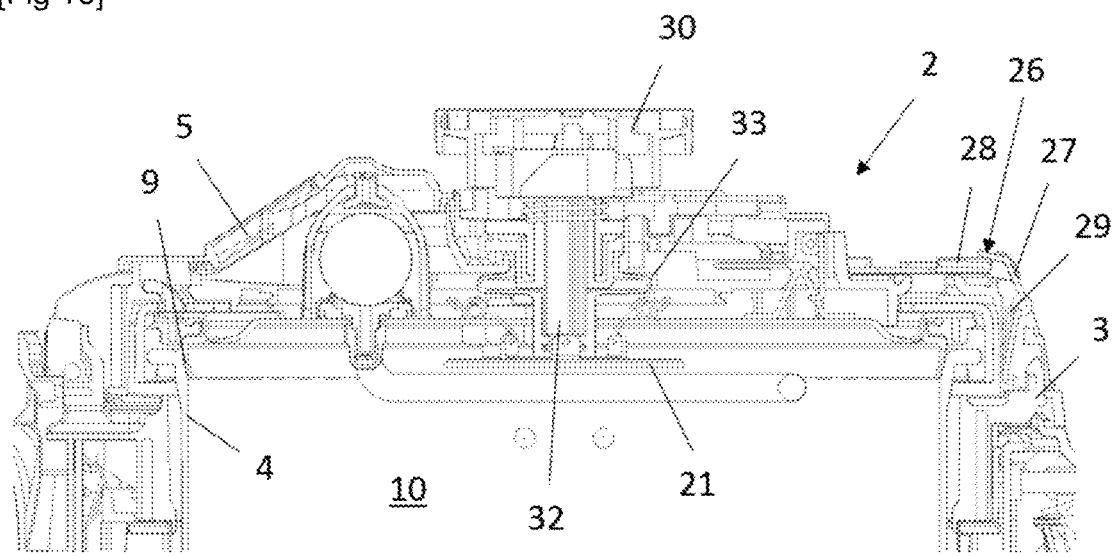

[Fig 17]
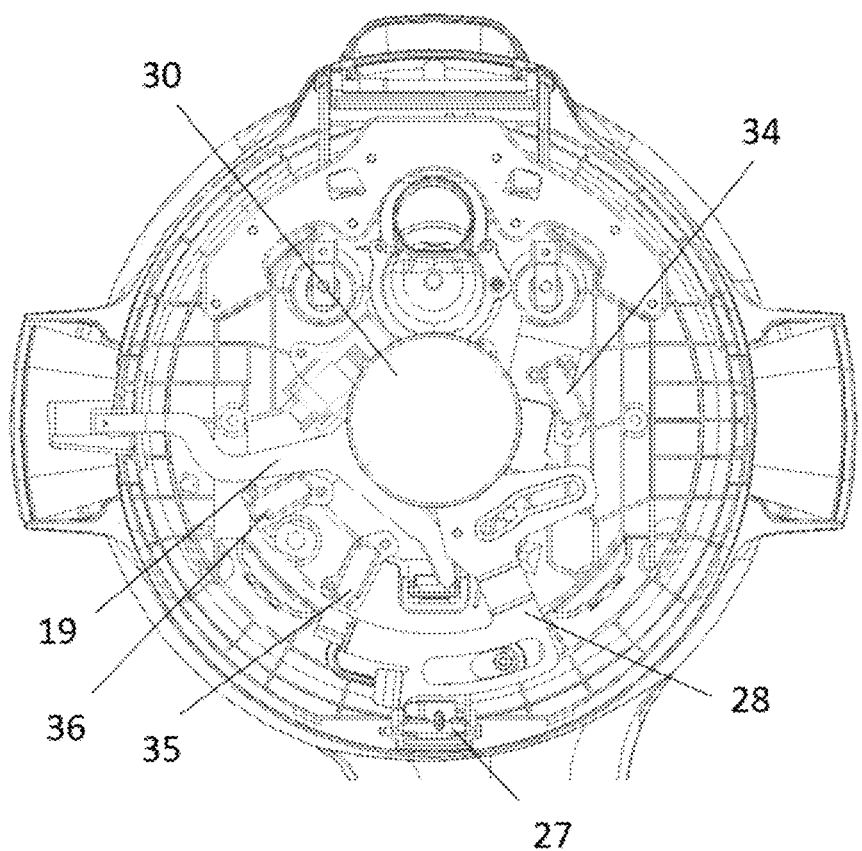
[Fig 18]
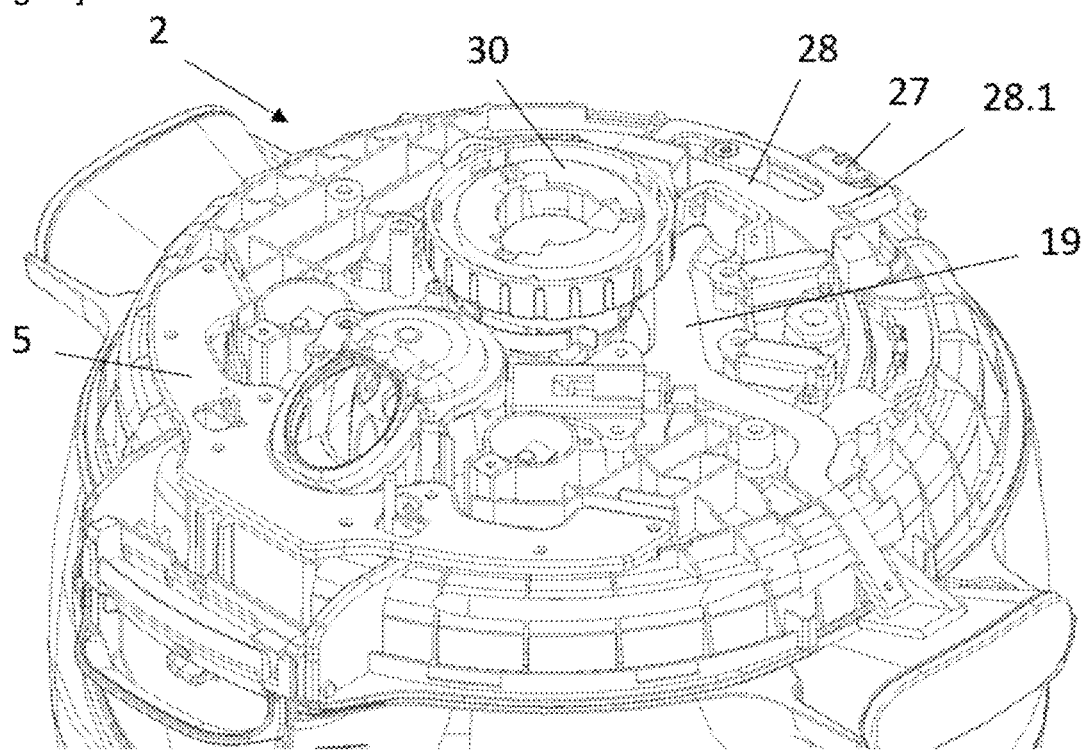

[Fig 19]
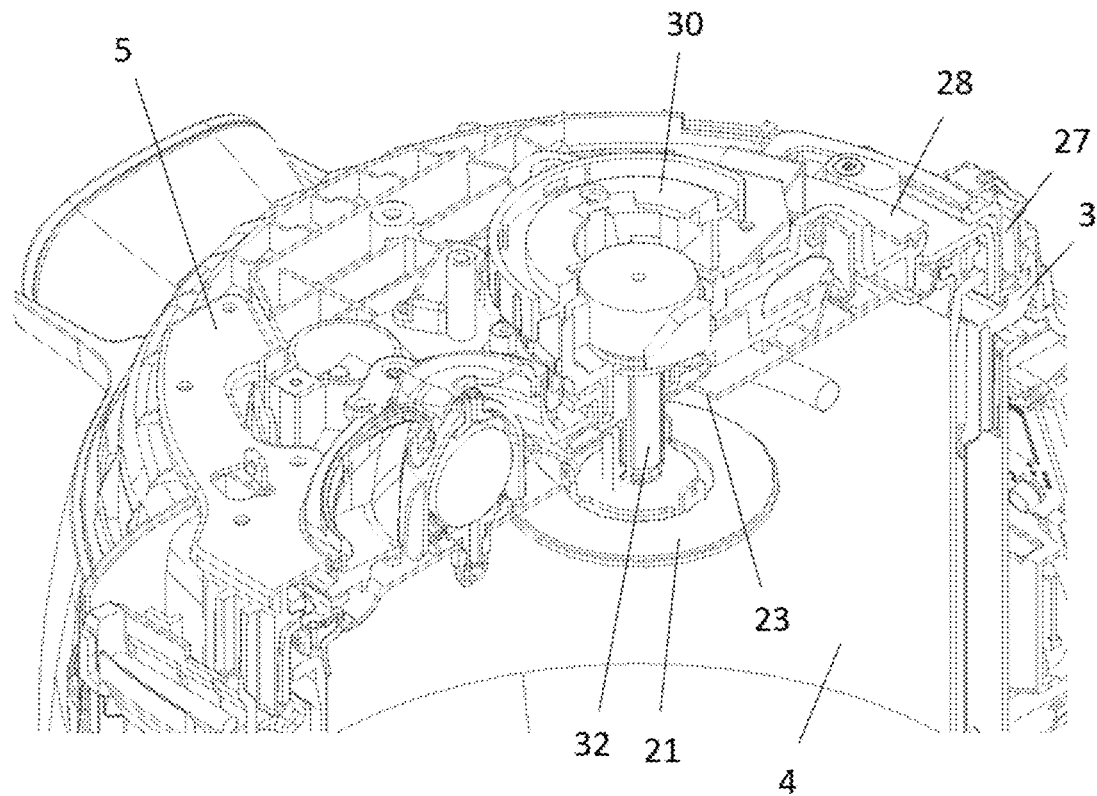
[Fig 20]
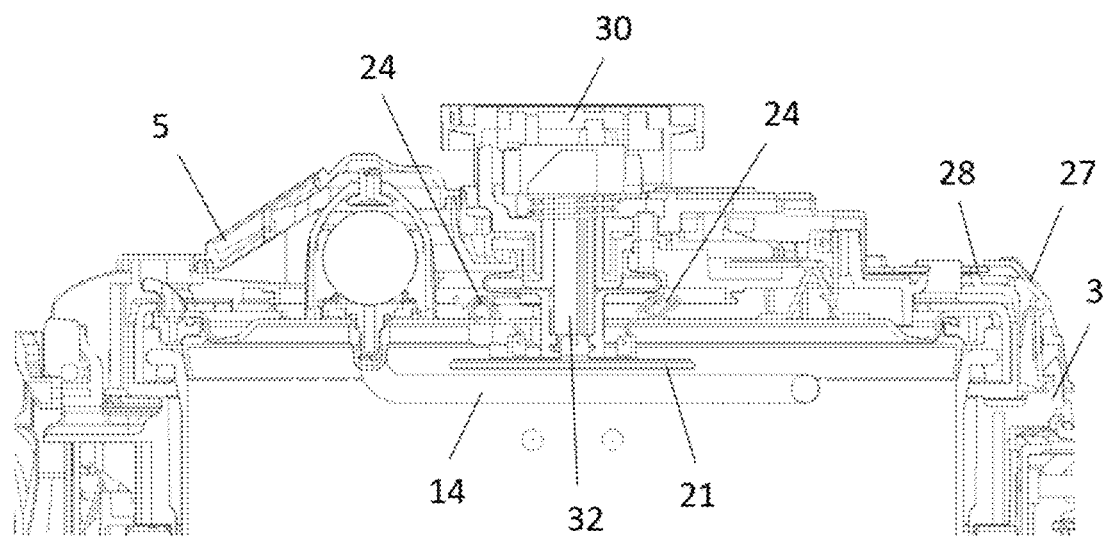

[Fig 21]
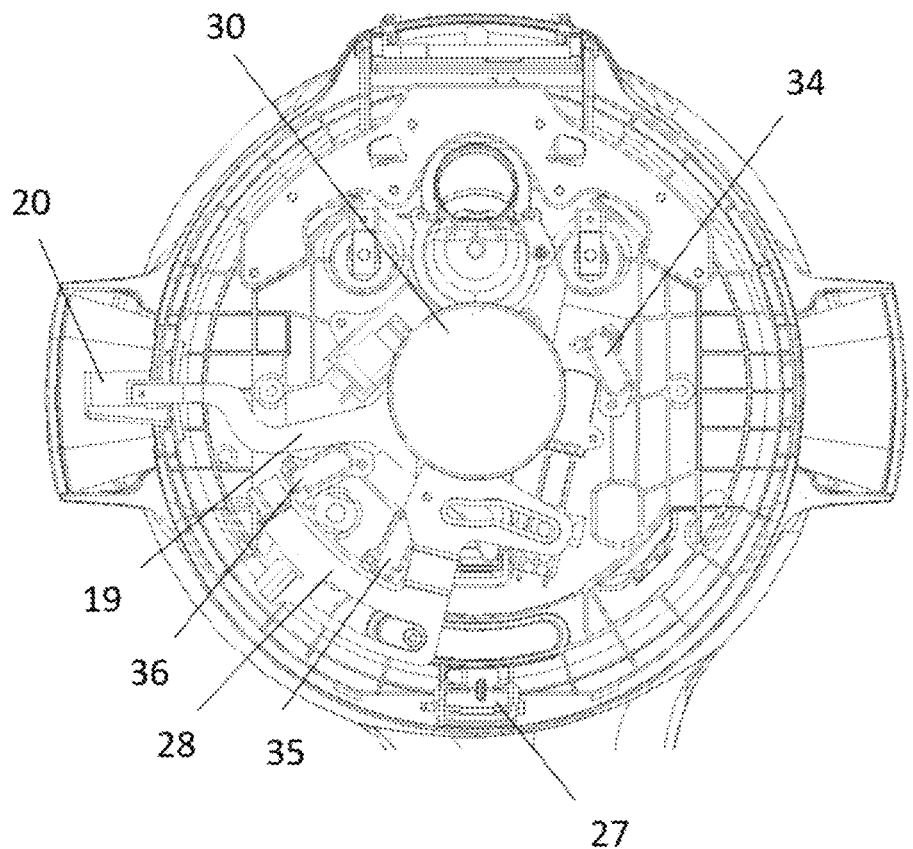
[Fig 22]
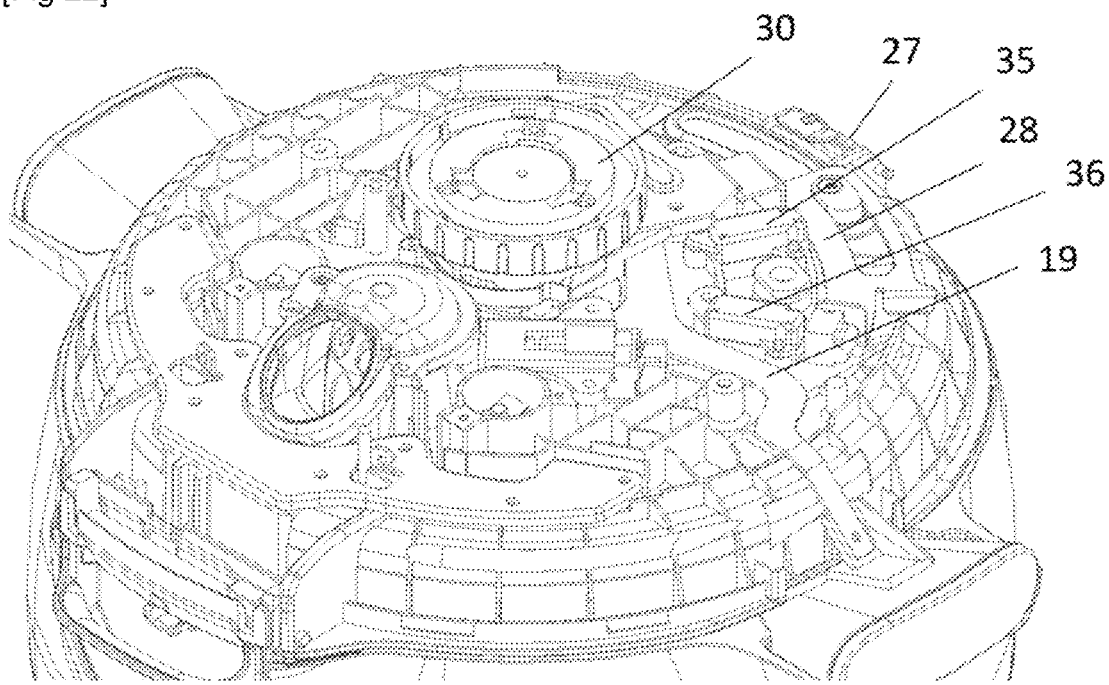

[Fig 23]
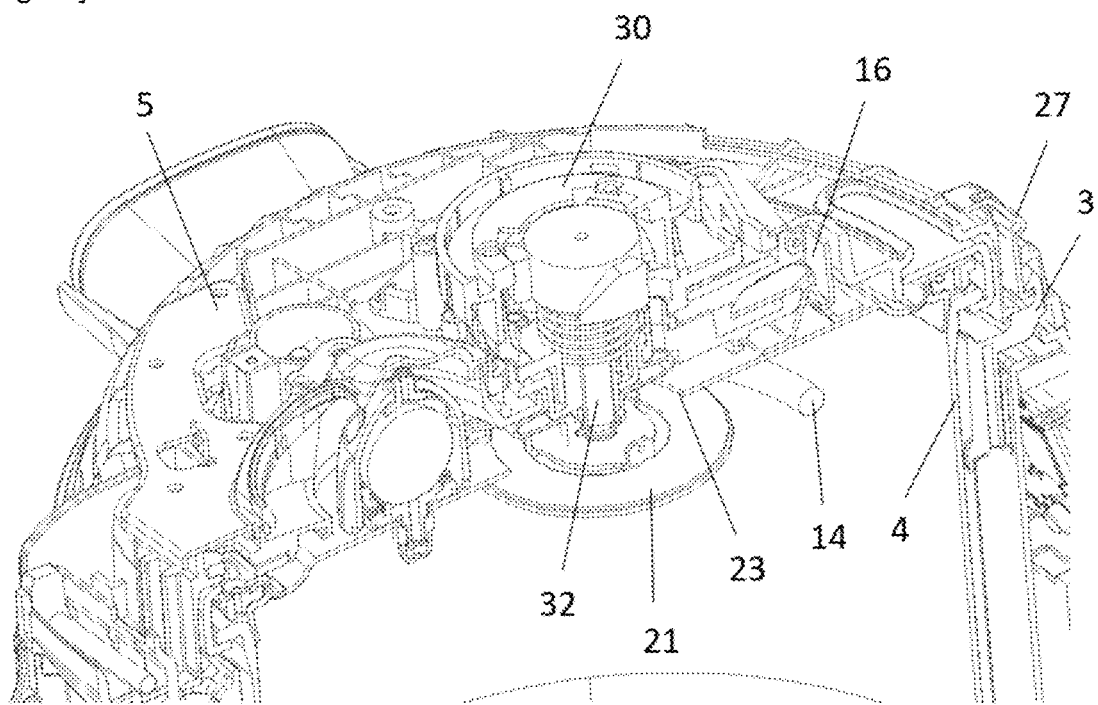
[Fig 24]
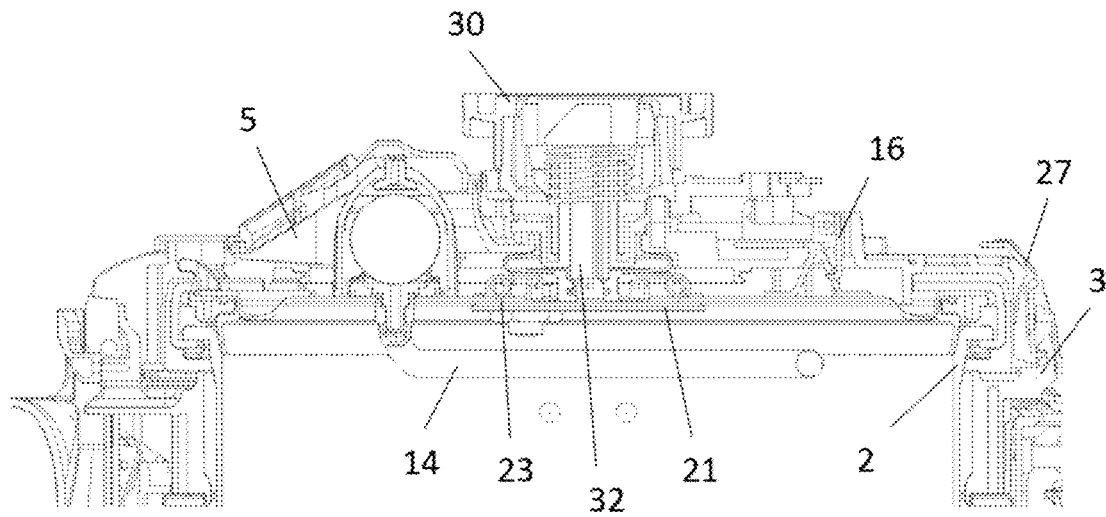

ELECTRIC COOKING APPLIANCE PROVIDED WITH A REMOVABLE HEATING DEVICE

CROSS-REFERENCE TO RELATED APPLICATIONS

The present application claims priority from French Application No. 1907038, filed Jun. 27, 2019, all of which are hereby incorporated herein by reference.

TECHNICAL FIELD

The present invention relates in general to an electric cooking appliance for cooking food with or without pressure, such as an electric pressure cooker or an electric multi-cooker with or without pressure.

STATE OF THE ART

From documents CN109463999A or WO2012056175A2 an electric cooking appliance is known comprising in a known manner:
- a housing comprising a cooking vessel configured to receive food to be cooked,
- a lid pivotally mounted on the housing between an open position in which the lid frees access to the cooking vessel and a closed position in which the lid prevents access to the cooking vessel, and
- a heating element which is arranged in the housing and which is configured to heat the cooking vessel by conduction and convection, the heating element advantageously being formed by a resistive heating element extending around a side wall of the cooking vessel.

Such an arrangement of the heating element makes it possible to heat the side wall of the cooking vessel and therefore to ensure the cooking of the food placed in the cooking vessel. Such cooking can be carried out under pressure or without pressure depending on whether the electric cooking appliance is an electric pressure cooker or an electric multi-cooker without pressure.

However, such an electric cooking appliance does not in particular provide for cooking the food placed in the cooking vessel by grilling.

There is also known from these documents a heating device mounted on an inner surface of the lid, the heating device comprising a heating member configured to be located opposite the food to be cooked placed in the cooking vessel and to heat said food to cook it when the lid is in the closed position.

However, this heating device cannot be easily cleaned.

SUMMARY OF THE INVENTION

The present invention is intended to remedy all or part of these drawbacks.

The technical problem underlying the invention consists in particular in providing an electric cooking appliance which is of a simple structure and which is easy to clean, while allowing the grilling of the food placed in a cooking vessel of the electric cooking appliance.

To this end, the present invention relates to an electric cooking appliance comprising:
- a housing comprising a cooking vessel configured to receive food to be cooked, and
- a lid pivotally mounted on the housing between an open position in which the lid frees access to the cooking vessel and a closed position in which the lid prevents access to the cooking vessel, the electric cooking appliance further comprising a heating device which is mounted on an inner surface of the lid, the heating device comprising a heating member configured to be located opposite the food to be cooked and placed in the cooking vessel and to heat said food to be cooked when the lid is in the closed position, said electric cooking appliance being characterized in that the heating device is removably mounted on the inner surface of the lid.

Such an arrangement of the heating device makes it possible to cook the food placed in the cooking vessel by grilling, and therefore to be able to cook this food quickly and, for example, without adding fat or with very little added fat. Grilling also makes it possible to "brown" food, which is not possible with electric cooking appliances such as electric pressure cookers.

In addition, the fact that the heating device is removable from the lid makes it easier to clean it, and in particular to wash it in the dishwasher.

Thus, the electric cooking appliance according to the present invention is easy to clean, while enabling grilling.

Moreover, if the electric cooking appliance according to the present invention is also provided with a heating element arranged in the housing, it is then possible, at the option of the user, to heat the food placed in the cooking vessel by conduction cooking (i.e. by heating the side wall of the cooking vessel) or by grilling.

In addition, if the electric cooking appliance according to the present invention is provided with a heating element arranged in the housing, the food placed in the cooking vessel can also be cooked slowly via the heating element, and finally be browned via the heating member.

The electric cooking appliance can also have one or more of the following characteristics, taken alone or in combination.

According to one embodiment of the invention, the heating device comprises a closing element configured to close at least partially an access opening of the cooking vessel when the lid is in the closed position, the heating member being secured to the closing element.

According to one embodiment of the invention, the closing element comprises a first surface configured to be oriented towards the lid, and a second surface configured to be oriented towards the cooking vessel when the lid is in the closed position, the heating member extending over the second surface of the closing member.

According to one embodiment of the invention, the closing element and the cooking vessel define a cooking enclosure when the lid is in the closed position, the heating member being configured to be placed in the cooking enclosure.

According to one embodiment of the invention, the closing element is configured to seal the access opening of the cooking vessel in a sealed manner when the lid is in the closed position.

According to one embodiment of the invention, the heating device comprises an annular sealing element which is fixed to the closing element and which is configured to cooperate in a sealed manner with the access opening of the cooking vessel.

According to one embodiment of the invention, the heating member is a resistive heating element.

According to one embodiment of the invention, the electric cooking appliance comprises a locking mechanism configured to lock the heating device onto the lid, and more particularly to lock the closing element onto the lid.

According to one embodiment of the invention, the locking mechanism comprises a locking element, such as a locking finger, provided on the lid and mounted movable between a locking position in which the locking element cooperates with the heating device so as to lock the heating device onto the lid, and a release position in which the locking element releases the heating device and allows the disassembly of the heating device.

According to one embodiment of the invention, the locking element is pivotally mounted around a pivot axis.

According to one embodiment of the invention, the heating device comprises a locking member configured to cooperate with the locking element provided on the lid when the locking element is in the locking position. Advantageously, the locking member is disposed on the closing element, and, for example, on the first surface of the closing element.

According to one embodiment of the invention, the locking member comprises a locking opening and the locking element is configured to be inserted at least partially into the locking opening when the locking element is in the locking position.

According to one embodiment of the invention, the electric cooking appliance comprises a biasing member configured to bias the locking element towards the locking position.

According to one embodiment of the invention, the electric cooking appliance comprises an actuating member configured to move the locking element from the locking position to the release position.

According to one embodiment of the invention, the actuating member is mounted movable on the lid between a rest position in which the locking element is in the locking position and an unlocking position in which the element locking device is in the release position, the actuating member being configured so that a movement of the actuating member from the rest position to the unlocking position results in a displacement of the locking member from the locking position to the release position.

According to one embodiment of the invention, the actuating member comprises a gripping part, such as a gripping handle, which can be manipulated by a user so as to move the actuating member between the rest position and the unlocking position.

According to one embodiment of the invention, the gripping part is accessible for a user only when the lid is in the open position. These provisions ensure the secure disassembly of the heating device, in particular when the electric cooking appliance is provided with a safety device preventing the lid from being opened, for example as long as the temperature of the heating member is above a predetermined temperature value.

According to one embodiment of the invention, the actuating member is mounted pivotally on the lid around an axis of movement.

According to one embodiment of the invention, the actuating member is an actuating lever.

According to one embodiment of the invention, the electric cooking appliance comprises a retaining receptacle which is provided on the lid, and the heating device comprises a retaining member, such as a retaining finger, which is configured to be received into the retaining axis when the heating device is mounted on the lid. Such a configuration of the electric cooking appliance in particular ensures an easier pre-positioning of the heating device with respect to the lid before the heating device is locked onto the lid.

According to one embodiment of the invention, the retaining receptacle is located opposite the locking element.

According to one embodiment of the invention, the retaining member is integral with the closing element.

According to one embodiment of the invention, the heating device is mounted movable in relation to the lid between a locking position in which the heating device is locked on the lid by the locking mechanism, and a gripping position in which the heating device is released by the locking mechanism and is removable.

According to one embodiment of the invention, the heating device is held in the gripping position at least in part by the cooperation of the retaining member with the retaining receptacle.

According to one embodiment of the invention, the heating device is configured to be automatically moved from the locked position to the gripping position when the locking element is moved from the locking position to the release position.

According to one embodiment of the invention, the electric cooking appliance comprises a steam outlet opening and a steam outlet valve which is movable between a first valve position in which the steam outlet valve releases the steam outlet opening and places the interior of the cooking vessel in communication with the exterior of the electric cooking appliance so as to allow a steam outlet towards the outside of the electric cooking appliance, and a second valve position in which the steam outlet valve closes the steam outlet opening (and therefore fluidly isolates the interior of the cooking vessel from the exterior of the electric cooking appliance) so as to allow pressure build-up in the cooking vessel.

According to one embodiment of the invention, the steam outlet valve is mounted on the closing element.

According to one embodiment of the invention, the electric cooking appliance comprises at least one biasing element, such as a biasing spring, which is configured to bias the steam outlet valve towards the second valve position. Advantageously, the at least one biasing element is provided on the closing element.

According to one embodiment of the invention, the electric cooking appliance comprises a lid locking mechanism configured to lock the lid in the closed position, and a control member configured to be manipulated by a user and to control a locking and an unlocking of the lid in relation to the housing, the control member being movable mounted on the lid and being configured to occupy:
  a first control position in which the lid is unlocked in relation to the housing and the lid can be moved into the open position,
  a second control position in which the lid is locked in the closed position and the steam outlet valve is held in the first valve position, and
  a third control position in which the lid is locked in the closed position and the steam outlet valve is held in the second valve position.

Thus, the electric cooking appliance is configured such that a movement of the control member from the second control position to the third control position results in a displacement of the steam outlet valve from the first valve position to the second valve position, and such that a movement of the control member from the third control position to the second control position causes the steam outlet valve to move from the second valve position to the first valve position.

Such a configuration of the electric cooking appliance makes it possible, quite simply by actuating the control member, to configure the electric cooking appliance for grilling without pressure when the control member is in the second control position (because the steam can escape through the steam outlet valve), or for pressure cooking when the control member is in the third control position (because the steam outlet valve then prevents the steam from escaping outside the electric cooking appliance).

In addition, the control member makes it possible, in a single action by the user, to control the locking of the lid and to select the cooking mode of the electric cooking appliance according to the present invention, which greatly facilitates the use of the electric cooking appliance according to the present invention.

Furthermore, the fact that the same member ensures the selection of the cooking mode of the electric cooking appliance and the locking of the lid thereof limits the manufacturing costs of the electric cooking appliance and increases the reliability thereof.

According to one embodiment of the invention, the heating member can be activated when the control member is in the second control position.

According to one embodiment of the invention, the lid locking mechanism comprises a lid locking member provided on the lid and mounted movable between a lid locking position in which the lid locking member cooperates with the housing so as to lock the lid in the closed position, and a lid release position in which the lid locking member releases the housing and allows movement of the lid towards the open position.

According to one embodiment of the invention, the lid locking mechanism comprises a drive member configured to move the lid locking member from the lid locking position to the lid release position.

According to one embodiment of the invention, the control member is mechanically connected to the drive member. Advantageously, the drive member is integral in rotation with the control member.

According to one embodiment of the invention, the control member is rotatably mounted in relation to the lid.

According to one embodiment of the invention, the electric cooking appliance comprises a valve piston which is configured to move the steam outlet valve into the first valve position when the control member is moved into the second control position.

According to one embodiment of the invention, the valve piston is also configured to move the steam outlet valve into the first valve position when the control member is moved into the first control position.

According to one embodiment of the invention, the valve piston is mounted on the lid.

According to one embodiment of the invention, the electric cooking appliance comprises a heating element which is arranged in the housing and which is configured to heat the cooking vessel, for example at least by conduction.

According to one embodiment of the invention, the heating element can be activated when the control member is in the third control position.

According to one embodiment of the invention, the electric cooking appliance comprises a gasket that is configured to be interposed between the lid and the heating device, and more particularly between the lid and the closing element.

According to one embodiment of the invention, the gasket is configured to extend around the steam outlet valve.

According to one embodiment of the invention, the gasket is configured to bias the heating device towards the gripping position.

According to one embodiment of the invention, the electric cooking appliance comprises first electrical contacts provided on the lid and second electrical contacts provided on the closing element, the first electrical contacts being configured to cooperate with the second electrical contacts when the heating device is mounted on the lid, and, for example, locked onto the lid, so as to supply the heating member with electricity.

According to one embodiment of the invention, the first and second electrical contacts are protected from the steam generated in the cooking vessel by the gasket.

According to one embodiment of the invention, the electric cooking appliance comprises a pressure regulating valve which is configured to regulate the pressure inside the enclosure. The pressure regulating valve can, for example, be a ball valve.

Advantageously, the pressure regulating valve is mounted on the closing element.

According to one embodiment of the invention, the electric cooking appliance comprises a safety valve which is configured to place the interior of the cooking vessel, and in particular the cooking enclosure, in communication with the exterior of the electric cooking appliance when the pressure inside the cooking vessel exceeds a predetermined threshold value. Advantageously, the safety valve is mounted on the closing element.

According to one embodiment of the invention, the electric cooking appliance comprises a temperature sensor configured to determine the temperature of the heating device, and, for example, of the closing element.

According to one embodiment of the invention, the electric cooking appliance comprises a plurality of position sensors configured to detect the position occupied by the control member.

According to one embodiment of the invention, the electric cooking appliance comprises a control unit configured to control the electrical supply of the heating member when the control member is in the second control position, and, for example, when the plurality of position sensors has detected the fact that the control member is in the second control position.

According to one embodiment of the invention, the control unit is configured to control the electrical supply of the heating element when the control member is in the third control position, and, for example, when the plurality of position sensors has detected the fact that the control member is in the third control position.

According to one embodiment of the invention, the control unit is also configured to control the electrical supply of the heating member when the control member is in the third control position, for example, during an initial phase of a cooking mode of the electric cooking appliance in order to reduce the time necessary to pressurize the cooking vessel.

According to one embodiment of the invention, the electric cooking appliance is an electric pressure-cooking appliance, such as an electric pressure cooker or an electric multi-cooker with pressure.

According to another embodiment of the invention, the electric cooking appliance is a cooking appliance without electric pressure.

BRIEF DESCRIPTION OF THE FIGURES

The invention will be better understood with the help of the description below with reference to the attached schematic drawings showing, by way of non-limiting example, an embodiment of this electric cooking device.

FIG. 1 is a perspective view of an electric cooking appliance according to the present invention showing a lid thereof in the closed position.

FIG. 2 is a partial perspective view of the electric cooking appliance of FIG. 1 showing the lid in the open position.

FIG. 3 is a partial perspective view of the electric cooking appliance of FIG. 1 showing a heating device in the gripping position.

FIG. 4 is a side view of the electric cooking appliance of FIG. 1 showing the heating device in the gripping position.

FIG. 5 is a partial top view of the electric cooking appliance of FIG. 1 showing an actuating member in the unlocked position.

FIG. 6 is a sectional view of the lid and of the heating device in the gripping position.

FIG. 7 is a perspective view from above of the heating device.

FIG. 8 is a perspective view from below of the heating device.

FIG. 9 is a partial perspective view of the electric cooking appliance of FIG. 1 showing the lid in the open position and in which the heating device has been removed.

FIG. 10 is a partial side view, partially truncated, of the electric cooking appliance of FIG. 1 showing the heating device in the locked position.

FIG. 11 is a partial perspective view, partially truncated, of the electric cooking appliance of FIG. 1 showing the heating device in the locked position.

FIG. 12 is a partial side view, partially truncated, of the electric cooking appliance of FIG. 1 showing the heating device in the gripping position.

FIG. 13 is a partial top view of the electric cooking appliance of FIG. 1 showing a control member in a first control position.

FIG. 14 is a partial perspective view of the electric cooking appliance of FIG. 1 showing the control member in the first control position.

FIG. 15 is a partial perspective view, partially truncated, of the electric cooking appliance of FIG. 1 showing the control member in the first control position.

FIG. 16 is a partial side view, partially truncated, of the electric cooking appliance of FIG. 1 showing the control member in the first control position.

FIG. 17 is a partial top view of the electric cooking appliance of FIG. 1 showing the control member in a second control position.

FIG. 18 is a partial perspective view of the electric cooking appliance of FIG. 1 showing the control member in the second control position.

FIG. 19 is a partial perspective view, partially truncated, of the electric cooking appliance of FIG. 1 showing the control member in the second control position.

FIG. 20 is a partial side view, partially truncated, of the electric cooking appliance of FIG. 1 showing the control member in the second control position.

FIG. 21 is a partial top view of the electric cooking appliance of FIG. 1 showing the control member in a third control position.

FIG. 22 is a partial perspective view of the electric cooking appliance of FIG. 1 showing the control member in the third control position.

FIG. 23 is a partial perspective view, partially truncated, of the electric cooking appliance of FIG. 1 showing the control member in the third control position.

FIG. 24 is a partial side view, partially truncated, of the electric cooking appliance of FIG. 1 showing the control member in the third control position.

DETAILED DESCRIPTION

FIGS. 1 to 24 show an electric cooking appliance 2, and more particularly an electric pressure-cooking appliance, such as an electric pressure cooker or an electric multi-cooker with pressure.

As shown more particularly in FIGS. 1 and 2, the electric cooking appliance 2 comprises a housing 3 comprising a cooking vessel 4 configured to receive the food to be cooked, and a lid 5 pivotally mounted on the housing 3 between an open position (see FIG. 1) in which the lid 5 frees access to the cooking vessel 4 and a closed position (see FIG. 2) in which the lid 5 prevents access to the cooking vessel 4. According to the embodiment shown in the figures, the cooking vessel 4 has a substantially circular cross section. However, the cooking vessel 4 could have a cross section of any other shape, for example square or rectangular.

The electric cooking appliance 2 further comprises a heating element 6 which is arranged in the housing 3 and which is configured to heat the cooking vessel 4 by conduction. The heating element 6 can for example be a resistive heating element and extend around at least a portion of a side wall of the cooking vessel 4.

The electric cooking appliance 2 also comprises a heating device 7 which is removably mounted on an interior surface of the lid 5.

The heating device 7 comprises a closing element 8, for example metallic, configured to seal an access opening 9 of the cooking vessel 4 when the lid 5 is in the closed position. The closing element 8 and the cooking vessel 4 thus define a cooking enclosure 10 when the lid 5 is in the closed position.

In order to ensure a seal between the closing element 8 and the cooking vessel 4, the heating device 7 advantageously comprises an annular sealing element 11 (see in particular FIGS. 6 and 15) which is fixed to the closing element 8 and which is configured to cooperate in sealed manner with the access opening 9 of the cooking vessel 4.

The closing element 8 comprises a first surface 8.1 configured to be oriented towards the lid 5, and a second surface 8.2 configured to be oriented towards the cooking vessel 4 when the lid 5 is in the closed position. According to the embodiment shown in the figures, the closing element 8 has a generally circular shape.

The electric cooking appliance 2 further comprises a retaining receptacle 12 (see FIG. 9) which is provided on the lid 5, and the heating device 7 comprises a retaining member 13 (see FIGS. 6 and 7), such as a retaining finger, which is integral with the closing element 8 and which is configured to be received in the retaining receptacle 12 when the closing element 8 is mounted on the lid 5.

The heating device 7 in addition comprises a heating member 14 which is fixed to the closing element 8 and which extends over the second surface 8.2 of the closing element 8. The heating member 14 may, for example, be a resistive heating element, and extend substantially in an arc of circle. Advantageously, the angle at the center of the arc of circle defined by the heating member 14 is greater than 180°, and, for example, greater than 220°.

The heating member 14 is configured to be placed in the cooking enclosure 10 and to be located opposite the food to be cooked placed in the cooking vessel 4 when the lid 5 is in the closed position. Thus, the heating member 14 is more particularly configured to heat by radiation and by convection the food to be cooked placed in the cooking vessel 4 when the lid 5 is in the closed position.

The electric cooking appliance 2 also comprises a locking mechanism 15 configured to lock the heating device 7 onto the lid 5, and more particularly to lock the closing element 8 onto the lid 5.

As shown more particularly in FIGS. 11 and 12, the locking mechanism 15 comprises a locking element 16, such as a locking finger, pivotally mounted on the lid 5 around a pivot axis and between a locking position (see FIG. 11) in which the locking element 16 cooperates with a locking member 17 provided on the first surface 8.1 of the closing element 8 so as to lock the closing element 8 onto the lid 5, and a release position (see FIG. 12) in which the locking element 16 releases the locking member 17 and therefore the closing element 8, and thus allows removal of the heating device 7.

According to the embodiment shown in the figures, the locking member 17 comprises a locking opening 18 and the locking element 16 is configured to insert at least partially into the locking opening 18 when the locking element 16 is moved to the locking position. Advantageously, the locking element 16 is situated opposite the retaining receptacle 12 and is for example diametrically opposite the retaining receptacle 12.

The electric cooking appliance 2 advantageously comprises a biasing member (not visible in the figures), such as a biasing spring, mounted on the lid 5 and configured to bias the locking element 16 towards the locking position.

As shown in particular in FIG. 5, the electric cooking appliance 2 further comprises an actuating member 19, such as an actuating lever, configured to move the locking element 16 from the locking position towards the release position.

The actuating member 19 is pivotally mounted on the lid 5 around an axis of movement and between a rest position (see FIGS. 11 and 13) in which the locking element 16 is in the locking position and an unlocking position (see FIGS. 5 and 12) in which the locking element 16 is in the release position, the actuating member 19 being configured so that a movement of the actuating member 19 from the rest position to the unlocking position causes the locking element 16 to move from the locking position to the release position. The axis of movement of the actuating member 19 can for example be orthogonal to the pivot axis of the locking element 16. Advantageously, the actuating member 19 is configured to maintain the locking element 16 in the release position when the actuating member 19 is in the unlocking position.

According to the embodiment shown in the figures, the actuating member 19 comprises an actuating arm 19.1 configured to cooperate with the locking element 16, and a gripping arm 19.2 comprising a gripping part 20, such as a grip handle, which can be manipulated by a user so as to move the actuating member 19 between the rest position and the unlocking position. Advantageously, the gripping part 20 is accessible for a user only when the lid 5 is in the open position.

As shown more particularly in FIGS. 2 and 3, the heating device 7 is mounted movable in relation to the lid 5 between a locked position in which the heating device 7 is locked onto the lid 5 by the locking mechanism 15, and a gripping position in which the heating device 7 is released by the locking mechanism 15 and is removable.

Advantageously, a movement of the heating device 7 between the locked position and the gripping position induces a tilting of the heating device 7 around a tilting axis, which is substantially parallel to the pivot axis of the locking element 16 and which extends near the retaining member 13.

The heating device 7 is advantageously maintained stably in the gripping position partly due to the cooperation of the retaining member 13 with the retaining receptacle 12.

The electric cooking appliance 2 further comprises a steam outlet valve 21, which is mounted on the closing element 8 and which is movable between a first valve position (see FIGS. 15 and 16) in which the steam outlet valve 21 is moved away from a place of valve 22 extending around a steam outlet opening 23 provided on the closing element 8 and which places the interior of the cooking vessel 4 in communication with the outside of the electric cooking appliance 2 so as to allow the steam to exit towards the outside of the electric cooking appliance 2, and a second valve position (see FIGS. 23 and 24) in which the steam outlet valve 21 is supported as a seal on the valve seat 22 and fluidly insulates the interior of the cooking vessel 4 from the outside of the electric cooking appliance 2 so as to allow a pressure build-up in the cooking vessel 4. Typically, an electric pressure-cooking appliance 2 generates pressures ranging from 40 kPa to 100 kPa.

Advantageously, the electric cooking appliance 2 comprises a plurality of biasing elements 24 (see in particular FIG. 7), such as biasing springs, which are configured to bias the steam outlet valve 21 towards the second valve position. Advantageously, the biasing elements 24 are provided on the closing element 8 and are regularly distributed around the steam outlet opening 23.

As shown in FIG. 9, the electric cooking appliance 2 also comprises a gasket 25 which is mounted on the lid 5 and which is configured to be interposed between the lid 5 and the closing element 8. The gasket 25 is configured to extend around the steam outlet valve 21 and to bias the heating device 7 towards the gripping position.

The electric cooking appliance 2 further comprises a lid locking mechanism 26 configured to lock the lid 5 in the closed position.

The lid locking mechanism 26 comprises a lid locking member 27 provided on the lid 5 and mounted movable between a lid locking position (see FIGS. 19 and 20) in which the lid locking member 27 cooperates with the housing 3 so as to lock the lid 5 in the closed position, and a lid release position (see FIGS. 15 and 16) in which the lid locking member 27 releases the housing 3 and allows movement of the lid 5 to the open position.

As shown in particular in FIGS. 13, 14, and 16, the lid locking mechanism 26 further comprises a drive member 28 configured to move the lid locking member 27 from the lid locking position to the lid release position, and a return member 29 configured to bias the lid locking member 27 toward the lid locking position. The operation of the drive member 28 is described in more detail below.

The electric cooking appliance 2 also comprises a control member 30 which is mechanically connected to the drive member 28 and which is configured to be manipulated by a user and to control the locking and unlocking of the lid 5 in relation to the housing 3.

The control member 30 is mounted rotatably on the lid 5 and is configured to occupy:
 a first control position (see FIGS. 13 to 16) in which the lid 5 is unlocked in relation to the housing 3 and the lid 5 can be moved into the open position,
 a second control position (see FIGS. 17 to 20), also called grill position, in which the lid 5 is locked in the closed position, the steam outlet valve 21 is maintained in the first valve position and the heating element can be activated, and a third control position (see FIGS. 21 to 24), also called the pressure position, in which the lid 5 is locked in the closed position, the steam outlet valve 21 is held in the second valve position and the heating element 6 can be activated.

Thus, the electric cooking appliance 2 is configured such that a movement of the control member 30 from the second control position to the third control position results in a movement of the steam outlet valve 21 from the first valve position to the second valve position, and such that a movement of the control member 30 from the third control position to the second control position causes a movement of the steam outlet valve 21 from the second valve position to the first valve position.

According to the embodiment shown in the figures, the drive member 28 is integral in rotation with the control member 30 and is configured to occupy a first angular position (see in particular FIG. 13) in which the control member 30 is in the first control position and the drive member 28 immobilizes the lid locking member 27 in the lid release position, a second angular position (see in particular FIG. 17) in which the control member 30 is in the second control position and the drive member 28 does not cooperate with the lid locking member 27, and a third angular position (see in particular FIG. 21) in which the control member 30 is in the third control position and the drive member 28 is separated from the lid locking member 27, the first, second, and third angular positions being angularly offset from each other.

Advantageously, the drive member 28 comprises an inclined ramp 28.1 (see in particular FIG. 14) configured to lift a rear part of the lid locking member 27 and to pivot the latter in the release position of lid, when the drive member 28 is moved from the second angular position to the first angular position.

The electric cooking appliance 2 further comprises a valve piston 32 which is mounted on the lid 5 and which is mechanically connected to the control member 30, for example by a set of fingers and cams with variable slopes provided respectively on the control member 30 and the valve piston 32.

The valve piston 32 extends substantially parallel to the rotation axis of the control member 30 and is mounted movable in relation to the lid 5 between a first piston position (see FIG. 16) corresponding to the first valve position, and a second piston position (see FIG. 24) corresponding to the second valve position. The valve piston 32 is advantageously configured to occupy the first piston position when the control member 30 is in the first and second control positions, and to occupy the second piston position when the control member 30 is in the third control position.

The valve piston 32 is more particularly configured to move the steam outlet valve 21 into the first valve position (against the biasing force exerted by the biasing elements 24 on the steam outlet valve 21) when the control member 30 is moved into the first control position and into the second control position, and to allow the movement of the steam outlet valve 21 (due to the biasing force exerted by the biasing elements 24 on the steam outlet valve 21) into the second valve position when the control member 30 is moved to the third control position.

Advantageously, the valve piston 32 can be at least partially covered by a valve boot 33 so that the valve boot 33 is interposed between the valve piston 32 and the steam outlet valve 21, and this in order to protect the valve piston 32 and the control member 30 from moisture in particular.

The electric cooking appliance 2 also comprises a plurality of position sensors configured to detect the position occupied by the control member 30. The electric cooking appliance 2 can for example comprise a first position sensor 34 configured to detect that the control member 30 is in the first control position, a second position sensor 35 configured to detect that the control member 30 is in the second control position, and a third position sensor 36 configured to detect that the control member 30 is in the third control position.

According to one embodiment of the invention, the first position sensor 34 is configured to be activated by the drive member 28 when the drive member 28 is moved into the first angular position, the second position sensor 35 is configured to be activated by the drive member 28 when the drive member 28 is moved into the second angular position, and the third position sensor 36 is configured to be activated by the drive member 28 when the drive member 28 is moved into the third angular position.

The electric cooking appliance 2 also comprises first electrical contacts 37 (see FIG. 5) provided on the lid 5 and second electrical contacts 38 (see FIG. 7) provided on the closing element 8. The first electrical contacts 37 are configured to cooperate with the second electrical contacts 38 when the closing element 8 is locked onto the lid 5, and this so as to ensure an electrical supply to the heating member 14.

According to the embodiment shown in the figures, the first and second electrical contacts 37, 38 are protected from the steam generated in the cooking vessel 4 by the gasket 25.

Advantageously, the electric cooking appliance 2 comprises a pressure regulating valve 39 (see FIGS. 7 and 8) which is mounted on the closing element 8 and which is configured to regulate the pressure inside the cooking vessel 4, and in particular in the cooking enclosure 10. The pressure regulating valve 39 may, for example, be a ball valve.

The electric cooking appliance 2 can further comprise a safety valve 40 (see FIGS. 7 and 8) which is mounted on the closing element 8 and which is configured to place the interior of the cooking vessel 4, and in particular the cooking enclosure 10, in communication with the outside of the electric cooking appliance 2 when the pressure inside the cooking vessel 4 exceeds a predetermined threshold value.

The electric cooking appliance 2 can also comprise a temperature sensor 41 (see FIG. 9) configured to determine the temperature of the heating device 7, and, for example, of the closing element 8.

The electric cooking appliance 2 further comprises a control unit 42 configured to control the electrical supply of the heating element 6 and of the heating member 14 as a function in particular of the position occupied by the control member 30.

The control unit 42 is more particularly configured to control the electrical supply of the heating member 14 when the control member 30 is in the second control position, and therefore when the second position sensor 35 has detected the fact that the control member 30 is in the second control position. However, the control unit 42 could also be configured to control the electrical supply of the heating member 14 when the control member 30 is in the third control position, for example during an initial phase of a pressure-cooking mode of the electric cooking appliance 2, in order to reduce the time necessary to pressurize the cooking vessel 4.

The control unit 42 can, for example, be configured to control the electrical supply of the heating element 6 only when the control member 30 is in the third control position, and therefore when the third position sensor 36 has detected the fact that the control member 30 is in the third control position.

The control unit 42 may further comprise, in a known manner, buttons and/or a screen allowing a user to select a cooking mode. For example, the user can select a cooking time and temperature or choose from preset cooking programs.

Furthermore, the control unit 42 is configured to activate or deactivate the heating element 6 and the heating element 14 according to a part of a cooking program chosen by the user and, on the other hand, the temperature measurements recorded by the temperature sensor 41 and a possible additional temperature sensor associated with the heating element 6.

Thus, the electric cooking appliance 2 according to the present invention allows, quite simply by actuating the control member 30, to configure the electric cooking appliance 2 for grilling without pressure when the control member 30 is in the second control position (because the steam can escape through the steam outlet valve 21), or for pressure cooking when the control member 30 is in the third control position (because the steam outlet valve 21 then prevents steam from escaping to the outside of the electric cooking appliance).

In addition, the fact that the heating device 7 is removable makes it possible to greatly facilitate the cleaning of the electric cooking appliance 2 according to the present invention.

Of course, the invention is in no way limited to the embodiment described and illustrated, since this embodiment was only provided by way of example. It is still possible to make modifications, specifically in terms of the formation of the various elements or in terms of substituting equivalent techniques, without going beyond the protection domain of the invention. It is in this way in particular that the electric cooking appliance could be an electric cooking appliance without pressure.

The invention claimed is:

1. An electric cooking appliance comprising:
   a housing comprising a cooking vessel configured to receive food to be cooked;
   a lid pivotably mounted on the housing between an open position in which the lid is configured to free access to the cooking vessel and a closed position in which the lid is configured to prevent access to the cooking vessel;
   a heating device mounted on an inner surface of the lid, the heating device comprising a heating member configured to be located opposite the food to be cooked placed in the cooking vessel and for heating said food to be cooked when the lid is in the closed position, a closing element configured to seal the access opening of the cooking vessel when the lid is in the closed position, and an annular sealing element fixed to the closing element and configured to cooperate in a sealed manner with the access opening of the cooking vessel; and
   a locking mechanism configured to removably lock the heating device onto the lid,
   wherein the heating device is removably mounted on the inner surface of the lid, and
   wherein the heating member is fixed to the closing element.

2. The electric cooking appliance according to claim 1, wherein the closing element and the cooking vessel define a cooking enclosure when the lid is in the closed position, the heating member is configured to be arranged in the cooking enclosure.

3. The electric cooking appliance according to claim 1, further comprising a heating element arranged in the housing and configured to heat the cooking vessel.

4. The electric cooking appliance according to claim 1, wherein the electric cooking appliance is an electric pressure-cooking appliance.

5. The electric cooking appliance according to claim 1, wherein the locking mechanism comprises a locking element provided on the lid and movably mounted between a locking position in which the locking element is configured to cooperate with the heating device so as to lock the heating device onto the lid, and a release position in which the locking element is configured to release the heating device and to allow the removal of the heating device.

6. The electric cooking appliance according to claim 5, further comprising an actuator configured to move the locking element from the locking position to the release position.

7. The electric cooking appliance according to claim 6, wherein the actuating member is movably mounted on the lid between a rest position in which the locking element is in the locking position and an unlocking position in which the locking element is in the release position, wherein the actuating member is configured so that a movement of the actuating member from the rest position to the unlocking position causes the locking element to move from the locking position to the release position.

8. The electric cooking appliance according to claim 7, wherein the actuating member has a grip part configured to be manipulated by a user so as to move the actuating member between the rest position and the unlocking position.

9. The electric cooking appliance according to claim 8, wherein the gripping part is accessible for a user only when the lid is in the open position.

10. The electric cooking appliance according to claim 1, wherein the heating device is movably mounted in relation to the lid between a locked position in which the heating device is locked onto the lid by the locking mechanism, and a gripping position in which the heating device is released by the locking mechanism and is removable.

11. The electric cooking appliance according to claim 10, wherein the locking mechanism comprises a locking element provided on the lid and movably mounted between a locking position in which the locking element is configured to cooperate with the heating device so as to lock the heating device onto the lid, and a release position in which the locking element is configured to release the heating device and to allow the removal of the heating device, and
    wherein the heating device is configured to be automatically moved from the locked position to the gripping position when the locking member is moved from the locking position to the release position.

12. The electric cooking appliance according to claim 1, further comprising a steam outlet valve movable between a first valve position in which the steam outlet valve is configured to place the interior of the cooking vessel in communication with the exterior of the electric cooking appliance so as to allow steam to escape towards the outside of the electric cooking appliance, and a second valve position in which the steam outlet valve is configured to fluidly isolate the interior of the cooking vessel from the exterior of the electric cooking appliance so as to allow a rise in pressure in the cooking vessel.

13. The electric cooking appliance according to claim 12, further comprising at least one biasing element configured to bias the steam outlet valve towards the second valve position.

14. The electric cooking appliance according to claim 12, further comprising a lid locking mechanism configured to lock the lid in the closed position, and a control member configured to be operated by a user and for controlling a locking and unlocking of the lid in relation to the housing, wherein the control member is movably mounted on the lid and is configured to occupy:
- a first control position in which the lid is unlocked in relation to the housing and the lid is configured to be moved into the open position,
- a second control position in which the lid is locked in the closed position and the steam outlet valve is held in the first valve position, and
- a third control position in which the lid is locked in the closed position and the steam outlet valve is held in the second valve position.

15. The electric cooking appliance according to claim 14, further comprising a valve piston configured to move the steam outlet valve into the first valve position when the controller is moved into the second control position.

* * * * *